United States Patent
Ganakota et al.

(10) Patent No.: US 12,316,205 B2
(45) Date of Patent: May 27, 2025

(54) ROTOR OVERHANG DESIGN FOR DIRECT OIL COOLING OF ELECTRIC MACHINES

(71) Applicant: FCA US LLC, Auburn Hills, MI (US)

(72) Inventors: Sachin Ganakota, Auburn Hills, MI (US); Shreyas Kapatral, Oakland Township, MI (US); Steven L Hayslett, Troy, MI (US); Brandon R Given, Oakland, MI (US); Dhafar Al-Ani, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 280 days.

(21) Appl. No.: 18/186,475

(22) Filed: Mar. 20, 2023

(65) Prior Publication Data
US 2024/0322649 A1    Sep. 26, 2024

(51) Int. Cl.
*H02K 9/193* (2006.01)
*H02K 5/15* (2006.01)
*H02K 5/20* (2006.01)
*H02K 7/116* (2006.01)

(52) U.S. Cl.
CPC .............. *H02K 9/193* (2013.01); *H02K 5/15* (2013.01); *H02K 5/203* (2021.01); *H02K 7/116* (2013.01)

(58) Field of Classification Search
CPC .. H02K 1/20; H02K 1/32; H02K 5/15; H02K 5/20; H02K 5/203
USPC ................................ 310/52, 54, 58, 60 R, 61
See application file for complete search history.

(56) References Cited

U.S. PATENT DOCUMENTS

| | | | |
|---|---|---|---|
| 5,994,804 A * | 11/1999 | Grennan | H02K 9/06 310/58 |
| 7,723,874 B2 | 5/2010 | Woody et al. | |
| 7,732,953 B2 | 6/2010 | Telakowski | |
| 8,807,970 B2 | 8/2014 | Schlenhoff et al. | |
| 10,128,705 B2 | 11/2018 | Yang et al. | |
| 10,287,964 B2 | 5/2019 | Tokozakura et al. | |
| 2016/0006302 A1 | 1/2016 | Gugel et al. | |
| 2020/0036248 A1* | 1/2020 | Krais | H02K 1/30 |
| 2023/0344311 A1* | 10/2023 | Roux | H02K 5/15 |

* cited by examiner

*Primary Examiner* — Alexander A Singh
*Assistant Examiner* — Minki Chang
(74) *Attorney, Agent, or Firm* — Jeremy J. Klobucar

(57) ABSTRACT

An electric machine configured to generate and transfer drive torque to a driveline for propulsion of an electric vehicle includes a gearbox assembly, an electric motor having a rotor and a stator having end windings, and a thermal management system. The thermal management system includes a first end plate disposed at an axial end of the rotor. The first end plate has a central hub and an overhang. The overhang includes an outwardly extending radial rim and a lip. The radial rim includes an outer surface, an inner surface, and at least two passages defined therethrough. The first end plate facilitates cooling of the electric motor by directing fluid (i) off of the outer surface of the radial rim and onto an inner diameter of the end windings, and (ii) through the at least two passages and onto the inner diameter of the end windings.

19 Claims, 5 Drawing Sheets

ROTOR OVERHANG DESIGN FOR DIRECT OIL COOLING OF ELECTRIC MACHINES

FIELD

The present application generally relates to electrified vehicles and, more particularly, to thermal management systems for electric motors including traction and generation applications.

BACKGROUND

Electrified vehicles include mild hybrid electric vehicles (mHEV), plug-in hybrid electric vehicles (PHEV), battery electric vehicles (BEV). Some electrified vehicles include an electric drive module (EDM) for propulsion. EDMs have electric motors that are cooled by thermal systems to prevent overheating. However, in some examples, such conventional thermal systems may insufficiently cool the rotor and stator end windings of the electric motor. Insufficient cooling of the rotor and/or stator may result in higher operating temperatures that can affect the overall motoring performance, reliability and efficiency of the machine. Accordingly, while such conventional thermal systems do work for their intended purpose, there exists an opportunity for improvement in the relevant art.

SUMMARY

According to one example aspect of the invention, an electric machine or drive module (EDM) configured to generate and transfer drive torque to a driveline for propulsion of an electric vehicle is provided. In one exemplary implementation, the EDM includes a gearbox assembly, an electric motor having a stator and a rotor, and a thermal management system. The stator has end winding. The rotor rotates with a rotor shaft. The thermal management system includes a first end plate disposed at an axial end of the rotor. The first end plate has a central hub and an overhang. The overhang includes an outwardly extending radial rim and a lip. The radial rim includes an outer surface, an inner surface, and at least two passages defined therethrough. The first end plate facilitates cooling of the electric motor by directing fluid (i) off of the outer surface of the radial rim and onto an inner diameter of the end windings, (ii) around the inner surface of the radial rim whereby the fluid builds pressure due to centrifugal force created from rotation of the rotor and (iii) through the at least two passages and onto the inner diameter of the end windings.

In addition to the foregoing, the described EDM may include one or more of the following features: the lip extends parallel to the central hub; the overhang of the first plate further facilitates cooling of the electric motor by inhibiting fluid from flowing over the lip; the first end plate is formed of non-conducting metal; the first end plate is formed of aluminum alloy; the rotor shaft defines a central passage and a plurality of radial passages that direct the oil toward the first end plate.

In addition to the foregoing, the described EDM may include one or more of the following features: a water jacket disposed at a housing that houses the electric motor, wherein the water jacket defines nozzles that direct oil onto an outer diameter of the end windings; wherein the at least two passages comprises four passages including a first diametrically opposed pair of passages and a second diametrically opposed pair of passages.

In addition to the foregoing, the described EDM may include one or more of the following features: a second end plate disposed at an opposite end of the rotor from the first end plate, the second end plate having a central hub and overhang, the overhang including an outwardly extending radial rim and a lip, the radial rim including an outer surface, an inner surface, and at least two passages defined therethrough; wherein the second end plate facilitates cooling of the electric motor by directing fluid (i) off of the outer surface of the radial rim and onto an inner diameter of the end windings; (ii) around the inner surface of the radial rim whereby the fluid builds pressure due to centrifugal force created from rotation of the rotor; and (iii) through the at least two passages and onto the inner diameter of the end windings.

In addition to the foregoing, the described EDM may include one or more of the following features: a fluid circuit configured to supply a fluid to the gearbox assembly, the rotor, and the stator, and a pump configured to direct the fluid through the fluid circuit; a sump configured to receive fluid from the gearbox assembly, the rotor and the stator.

According to another example aspect of the invention, an electric motor is provided. In one exemplary implementation, the electric motor includes a stator and a rotor, and a thermal management system. The stator has end winding. The rotor rotates with a rotor shaft. The thermal management system includes a first end plate disposed at an axial end of the rotor. The first end plate has a central hub and an overhang. The overhang includes an outwardly extending radial rim and a lip. The radial rim includes an outer surface, an inner surface, and at least two passages defined therethrough. The first end plate facilitates cooling of the electric motor by directing fluid (i) off of the outer surface of the radial rim and onto an inner diameter of the end windings, and (ii) through the at least two passages and onto the inner diameter of the end windings.

In addition to the foregoing, the described electric motor may include one or more of the following features: the lip extends parallel to the central hub; the overhang of the first plate further facilitates cooling of the electric motor by inhibiting fluid from flowing over the lip; the first end plate is formed of non-conducting metal; the first end plate is formed of aluminum alloy; a water jacket disposed at a housing that houses the electric motor, wherein the water jacket defines nozzles that direct oil onto an outer diameter of the end windings; wherein the at least two passages comprises four passages including a first diametrically opposed pair of passages and a second diametrically opposed pair of passages.

In addition to the foregoing, the described electric motor may include one or more of the following features: a second end plate disposed at an opposite end of the rotor from the first end plate, the second end plate having a central hub and overhang, the overhang including an outwardly extending radial rim and a lip, the radial rim including an outer surface, an inner surface, and at least two passages defined therethrough; wherein the second end plate facilitates cooling of the electric motor by directing fluid (i) off of the outer surface of the radial rim and onto an inner diameter of the end windings; (ii) around the inner surface of the radial rim whereby the fluid builds pressure due to centrifugal force created from rotation of the rotor; and (iii) through the at least two passages and onto the inner diameter of the end windings.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Described herein are systems and methods for thermal management of an electric machine for an electric vehicle such as, for example, an electric vehicle (BEV). The EDM systems and methods described herein provide a cooling solution for electric motors housed within the EDM (or a hybrid transmission). As described herein in more detail, a thermal management system provides direct oil cooling to the rotor, the rotor shaft and stator end-windings of the electric motor. A pump supplies coolant (e.g., oil) to various components of the EDM. The thermal management system includes end plates disposed at opposite ends of the rotor. The end plates incorporate overhangs with oil passages. The thermal management system improves cooling effectiveness for electric motor cooling architectures that employ oil spray from the housing to directly cool the end-windings. As will be described herein, the rotor overhangs direct oil back from the rotor surfaces onto the end-windings thereby improving oil utilization for cooling.

Figure 1:
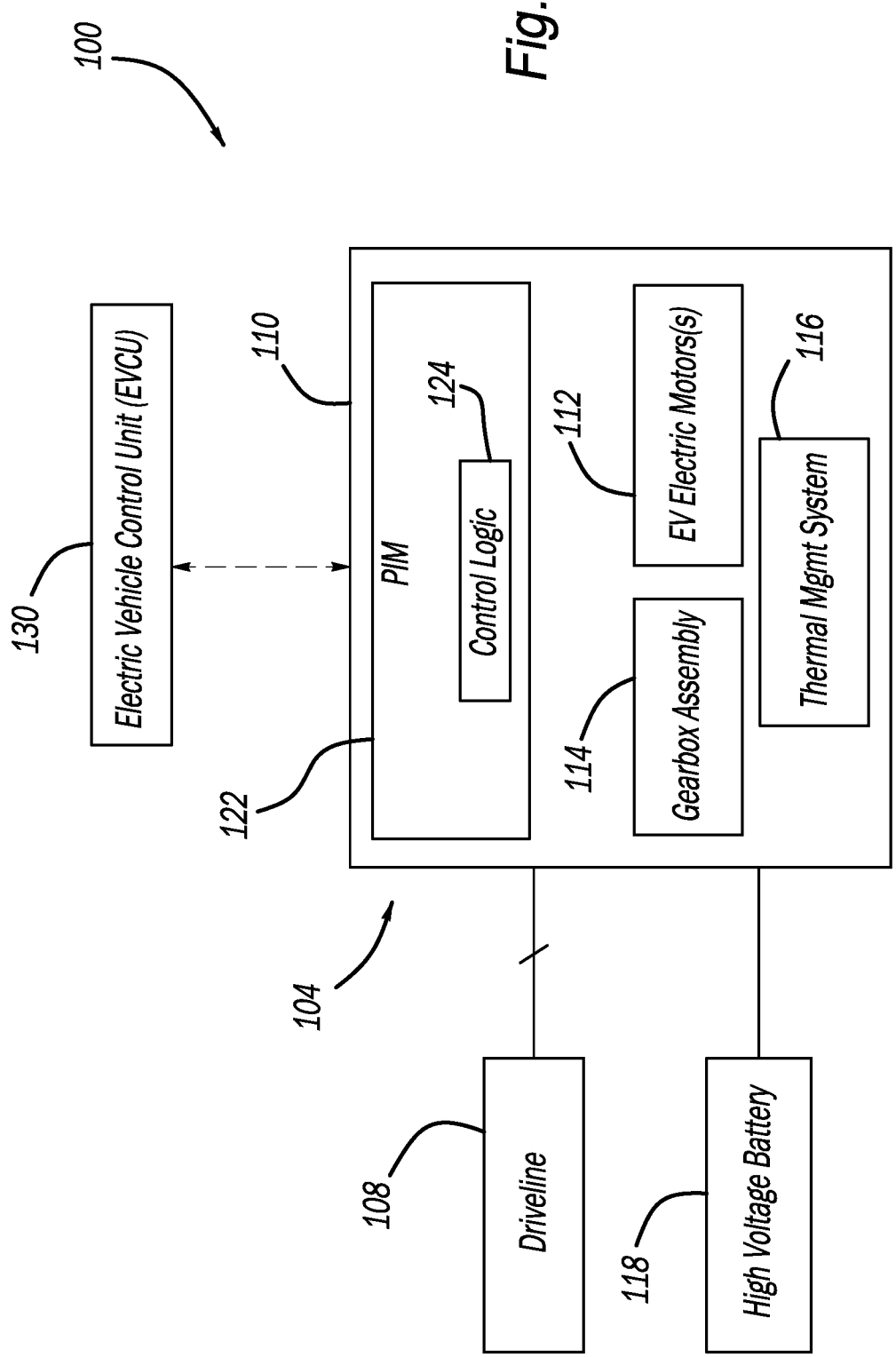
FIG. 1 is a functional block diagram of an example electric vehicle in accordance with the principles of the present application.

Referring now to FIG. 1, a schematic illustration of a BEV 100 (hereinafter, "vehicle 100") having an example thermal management system according to the principles of the present application is illustrated. The vehicle 100 generally comprises an electric machine or drive module (EDM) 104 configured to generate and transfer drive torque to a driveline 108 for vehicle propulsion. In the example embodiment, the EDM 104 generally comprises a housing 110, one or more EV electric motors 112 (e.g., electric traction motors), a gearbox assembly 114, and a thermal management system 116.

The electric motors 112 are selectively connectable to a high voltage battery system 118 for powering the electric motor(s) 112. The gearbox assembly 114 is configured to transfer the generated drive torque to the driveline 108, and the thermal management system 116 is configured to manage a temperature of the EDM components to prevent damage and improve operational efficiency. A power inverter module (PIM) 122 comprises its own control logic 124. An electrified vehicle control unit (EVCU) 130 generally controls the EDM 104 to generate a desired amount of drive torque to meet a driver demand (e.g., input via an accelerator pedal).

Figure 2:
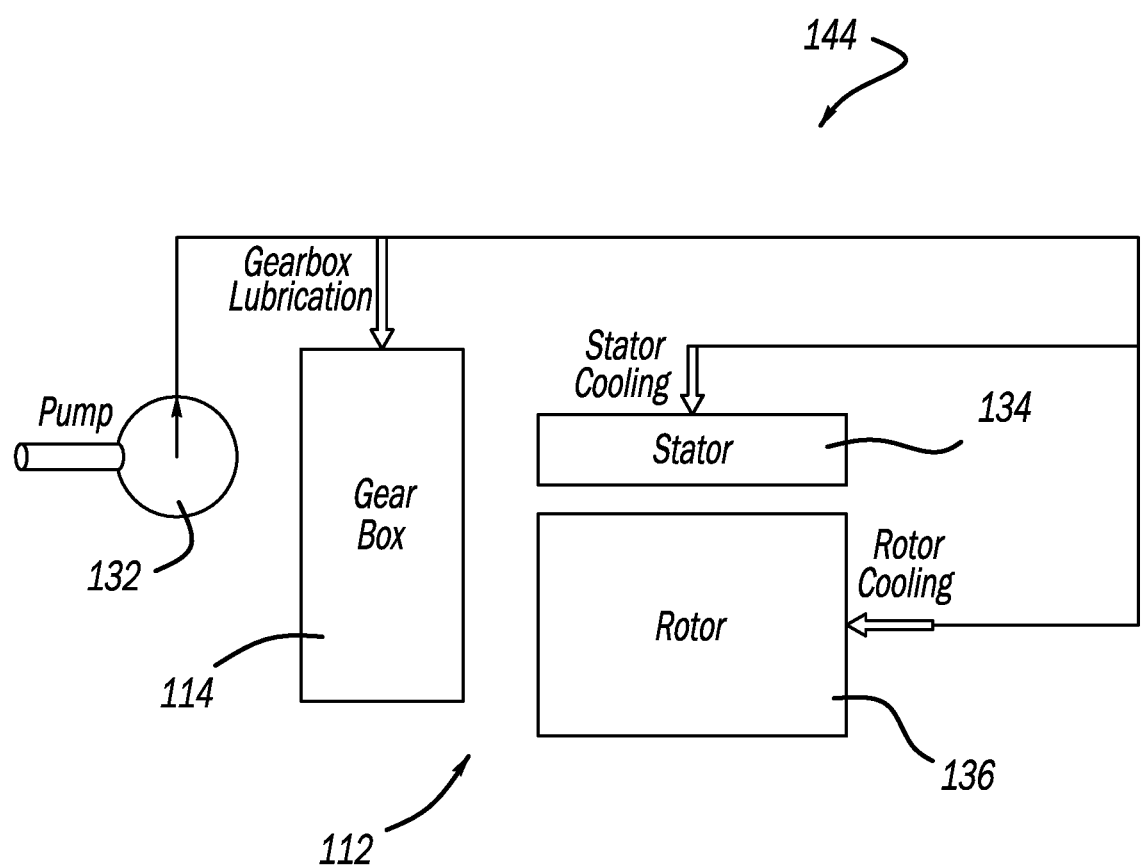
FIG. 2 is a schematic illustration of an example electric drive module for an electric vehicle (BEV) with a thermal management system in accordance with the principles of the present application.

Turning now to FIG. 2, a pump 132 pumps oil to the gear box 114 for gearbox lubrication, and to the electric motor 112 for cooling of the electric motor 112. In particular, the pump 132 pumps oil to a stator 134 of the electric motor 112 for stator cooling and to a rotor 136 of the electric motor 112 for rotor cooling and stator end winding cooling.

Figure 3:
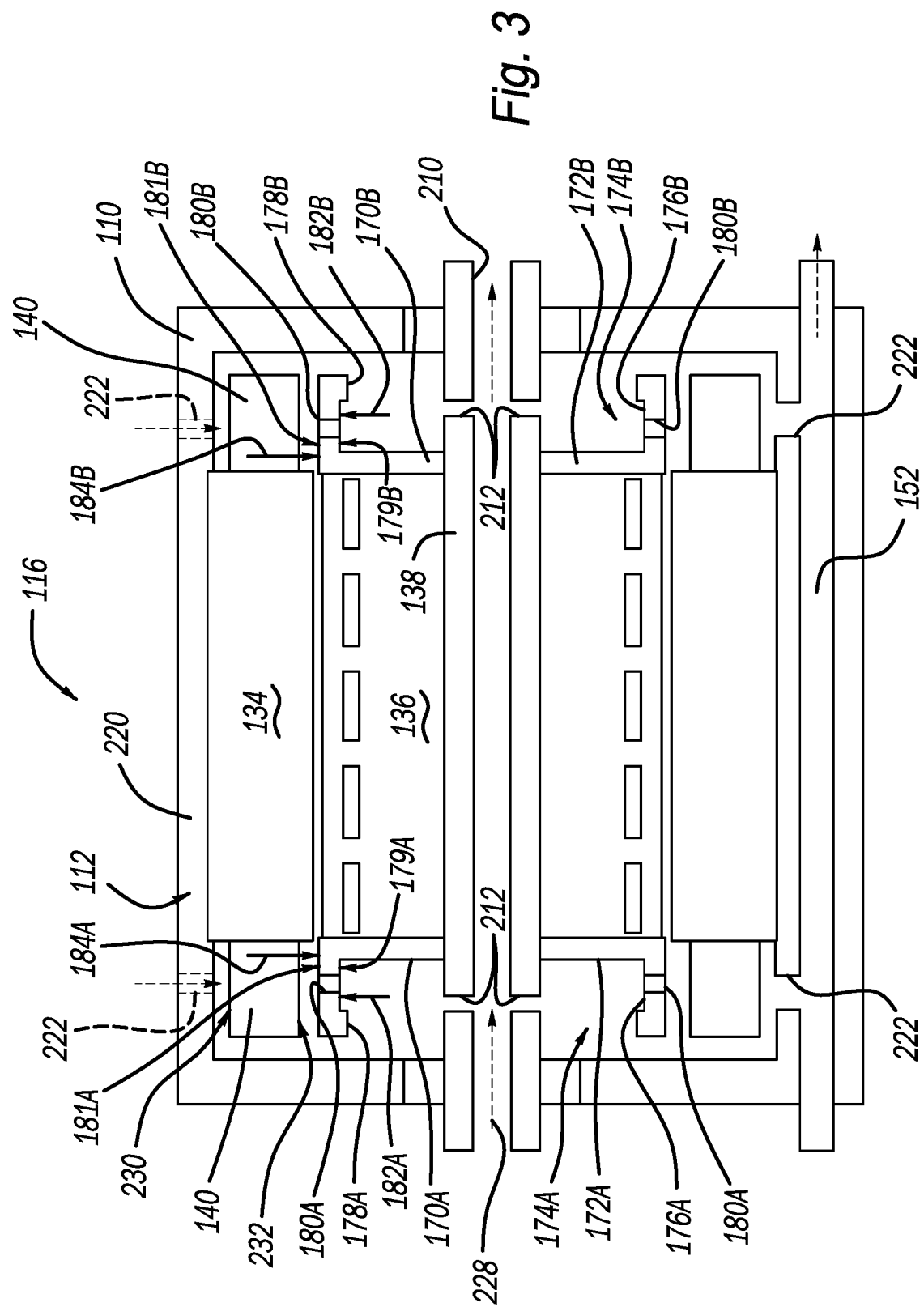
FIG. 3 is sectional view of the thermal management system of FIG. 2.

With additional reference now to FIG. 3, additional features of the thermal management system 116 will be described. In the example embodiment, each electric motor 112 generally includes the stator 134, the rotor 136, and a rotor shaft 138. The stator 134 is fixed (e.g., to the housing 110) and the rotor 136 is configured to rotate relative to the stator 134 maintaining an air gap to drive the rotor shaft 138 and thus the vehicle axles/wheels (not shown). The stator 134 includes end-windings 140. The EVCU 130 is typically powered by a low voltage battery (e.g., 12 volts, not shown), which could also be utilized to power one or more accessory loads (not shown) of the vehicle 100. The EVCU 130 communicates with the EDM 104 and other components via a CAN (e.g., the dashed communication lines connecting various systems). Specifically, in the example implementation, the EVCU 130 communicates with the EDM 104, including the gearbox assembly 114 and the thermal management system 116.

In the example embodiment, the thermal management system 116 is configured to provide a fluid (e.g., oil) for lubrication and/or cooling to various components of the EDM 104 and generally includes a fluid circuit 144 (FIG. 2) having the pump 132, and a sump 152. In the example embodiment, the pump 132 is configured to supply the fluid through the fluid circuit 144 to EDM components including the gearbox assembly 114, the stator 134, and the rotor 136. The sump 152 is configured to act as a reservoir to receive and collect the used/heated fluid after lubricating/cooling the EDM components.

The thermal management system 116 further includes end plates 170A and 170B arranged at opposite axial ends of the rotor 136. The end plates 170A and 170B can be formed of non-electrically conducting metal, such as, but not limited to aluminum alloy. In other examples the end plates can be formed of stainless steel. Other materials may be used. The end plate 170A generally includes a central hub 172A, and an overhang 174A. The overhang 174A generally includes an outwardly extending radial rim 176A and lip 178A. In examples, the lip 178A can be arranged generally parallel to (or inclined toward) the central hub 172A.

A plurality of passages 180A are defined through the overhang 174A at the radial rim 174A between inner and outer surfaces 179A and 181A. In the example shown, four passages 180A are defined through the end plate 170A. The passages 180A can include a first diametrically opposed pair and a second diametrically opposed pair. In one arrangement, the passages 180A can be formed at 90 degree increments around the overhang 174A. It will be appreciated however that additional or fewer passages may be incorporated in the end plate 170A.

The end plate 170B generally includes a central hub 172B, and an overhang 174B. The overhang 174B generally includes an outwardly extending radial rim 176B and lip 178B. In examples, the lip 178B can be arranged generally parallel to the central hub 172B. A plurality of passages 180B are defined through the overhang 174B at the radial rim 174B between inner and outer surfaces 179B and 181B. In the example shown, four passages 180B are defined through the end plate 170B. The passages 180B can include a first diametrically opposed pair and a second diametrically opposed pair. In one arrangement, the passages 180B can be formed at 90 degree increments around the overhang 174B. It will be appreciated however that additional or fewer passages may be incorporated in the end plate 170B. The radial rim 174A defines an inner diameter 182A and an outer diameter 184A. The radial rim 174B defines an inner diameter 182B and an outer diameter 184B.

The fluid circuit 144 will now be further described. The rotor shaft 138 defines a central passage 210 and a plurality of radial passages 212. A water jacket 220 disposed at the housing 110 includes oil nozzles 222. During operation, oil 228 is delivered through the central passage 210 of the rotor shaft 138 and through the oil nozzles 222. As will become appreciated from the following discussion, the end plates 170A, 170B cooperate to improve cooling effectiveness of the delivered oil 228 onto the rotor 136 and the end-windings 140 of the stator 134.

Figure 4:
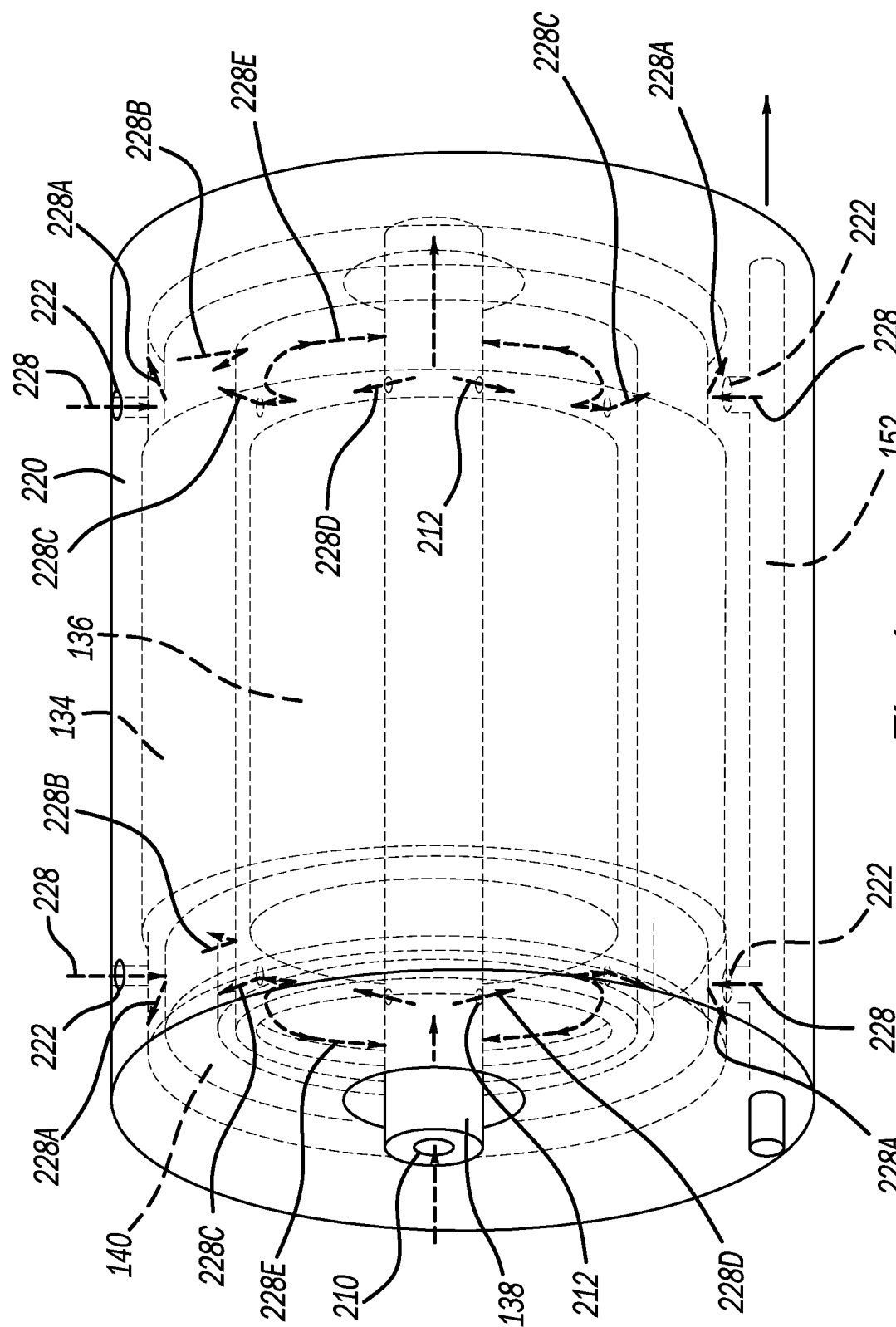
FIG. 4 is a front perspective view of the rotor, rotor shaft and end plate of the thermal management system according to principles of the present application.

The end-windings 140 have an outer diameter 230 (FIG. 3) that is splashed with oil 228A (FIG. 4) from the oil nozzles 222. The oil 228B flowing over the end-windings 140 can deflect off of the outer diameters 184A, 184B of the respective rims 176A, 176B and back onto an inner diameter 232 (FIG. 3) of the stator 134. In this regard, the end plates 170A and 170B improve oil utilization by inhibiting the oil from draining directly back to the sump after initially flowing over the end-windings 140. In addition, the inner diameter 232 of the end-windings 140 is further splashed with oil 228C expelled out of the passages 180A and 180B defined through the end plates 170A and 170B.

Figure 5:
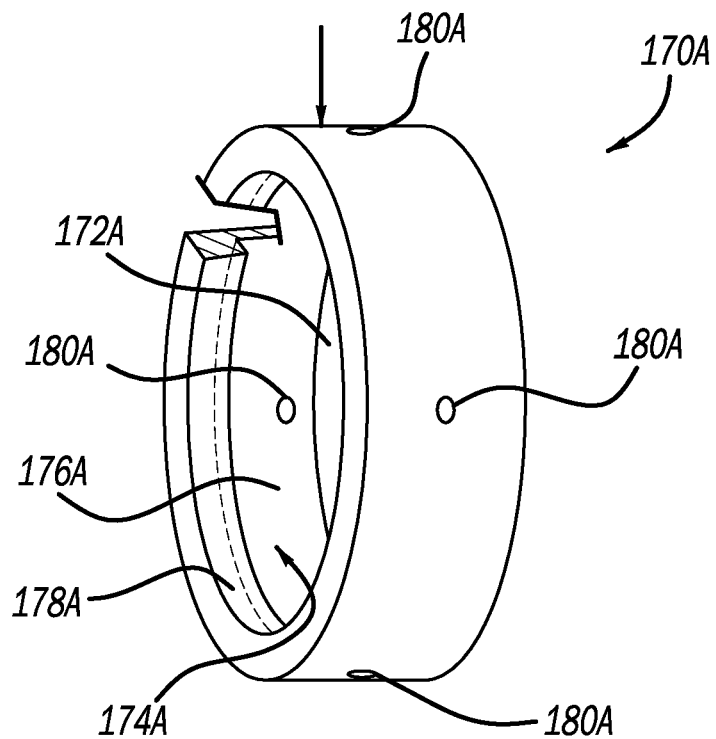
FIG. 5 is a perspective view of an end plate according to the principles of the present application.
Figure 6:
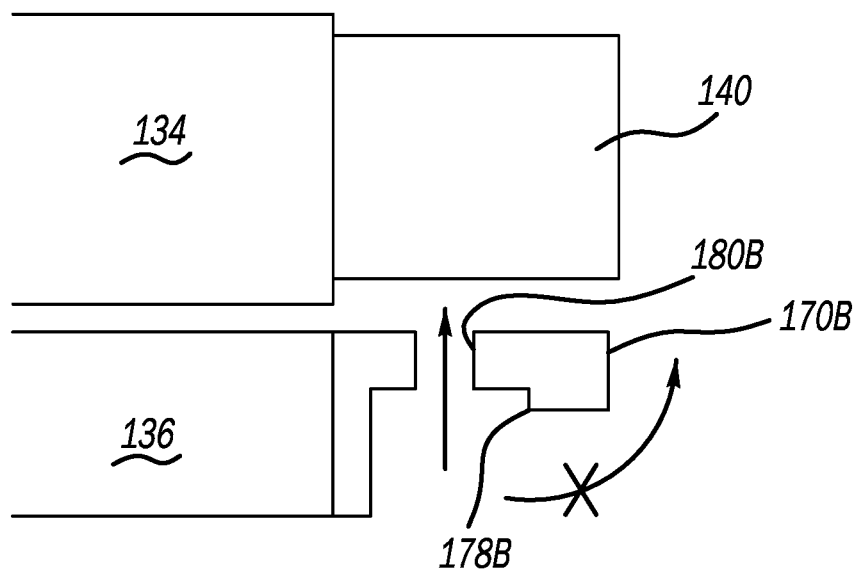
FIG. 6 is a detailed view of the rotor, stator, stator end-windings and end plate illustrating oil flow according to principles of the present application.

The rotor 136 is similarly cooled from the oil 228D expelled through the passages 212. As the rotor 136 and the end plates 170A, 170B rotate, centrifugal force can cause the oil 228E to build pressure at the rim 176A, 176B prior to exiting through the passages 180A and 180B. As can be appreciated the increased oil pressure assists in more effective fluid delivery onto the inner diameter 132 of the end-windings 140. Notably, and as depicted in FIGS. 5 and 6, the lips 178A and 178B of the respective overhangs 174A and 174B can direct the oil back toward the rotor 136 and inhibit oil 228E from immediately draining back directly to the sump 152. The oil 228 eventually will fall down into the sump 152 where the fluid circuit 144 repeats.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An electric machine configured to generate and transfer drive torque to a driveline for propulsion of an electric vehicle, the electric machine comprising:
  a gearbox assembly;
  an electric motor comprising:
    a stator having end windings; and
    a rotor that rotates with a rotor shaft; and
  a thermal management system including:
    a first end plate disposed at an axial end of the rotor, the first end plate having a central hub and an overhang, the overhang including an outwardly extending radial rim and a lip, the radial rim including an outer surface, an inner surface, and at least two passages defined therethrough,
    wherein the first end plate facilitates cooling of the electric motor by directing fluid (i) off of the outer surface of the radial rim and onto an inner diameter of the end windings; (ii) around the inner surface of the radial rim whereby the fluid builds pressure due to centrifugal force created from rotation of the rotor; and (iii) through the at least two passages and onto the inner diameter of the end windings.

2. The electric machine of claim 1, wherein the lip extends parallel to the central hub.

3. The electric machine of claim 1, wherein the overhang of the first end plate further facilitates cooling of the electric motor by inhibiting fluid from flowing over the lip.

4. The electric machine of claim 3, wherein the first end plate is formed of non-conducting metal.

5. The electric machine of claim 4, wherein the first end plate is formed of aluminum alloy.

6. The electric machine of claim 1, wherein the rotor shaft defines a central passage and a plurality of radial passages that direct the oil toward the first end plate.

7. The electric machine of claim 1, further comprising a water jacket disposed at a housing that houses the electric motor, wherein the water jacket defines nozzles that direct oil onto an outer diameter of the end windings.

8. The electric machine of claim 1, wherein the at least two passages comprises four passages including a first diametrically opposed pair of passages and a second diametrically opposed pair of passages.

9. The electric machine of claim 1, wherein the thermal management system further comprises:
  a second end plate disposed at an opposite end of the rotor from the first end plate, the second end plate having a central hub and an overhang, the overhang including an outwardly extending radial rim and a lip, the radial rim including an outer surface, an inner surface, and at least two passages defined therethrough,
  wherein the second end plate facilitates cooling of the electric motor by directing fluid (i) off of the outer surface of the radial rim and onto an inner diameter of the end windings; (ii) around the inner surface of the radial rim whereby the fluid builds pressure due to centrifugal force created from rotation of the rotor; and (iii) through the at least two passages and onto the inner diameter of the end windings.

10. The electric machine of claim 9, further comprising:
a fluid circuit configured to supply a fluid to the gearbox assembly, the rotor, and the stator; and
a pump configured to direct the fluid through the fluid circuit.

11. The electric machine of claim 1, further comprising:
a sump configured to receive fluid from the gearbox assembly, the rotor, and the stator.

12. An electric motor comprising:
a stator having end windings;
a rotor that rotates with a rotor shaft; and
a first end plate disposed at an axial end of the rotor, the first end plate having a central hub and an overhang, the overhang including an outwardly extending radial rim and a lip, the radial rim including an outer surface, an inner surface, and at least two passages defined therethrough;
wherein the first end plate facilitates cooling of the electric motor by directing fluid (i) off of the outer surface of the radial rim and onto an inner diameter of the end windings; (ii) around the inner surface of the radial rim whereby the fluid builds pressure due to centrifugal force created from rotation of the rotor; and (iii) through the at least two passages and onto the inner diameter of the end windings.

13. The electric motor of claim 12, wherein the lip extends parallel to the central hub.

14. The electric motor of claim 12, wherein the overhang of the first end plate further facilitates cooling of the electric motor by inhibiting fluid from flowing over the lip.

15. The electric motor of claim 12, wherein the first end plate is formed of non-conducting metal.

16. The electric motor of claim 12, wherein the first end plate is formed of aluminum alloy.

17. The electric motor of claim 12, further comprising a water jacket disposed at a housing that houses the electric motor, wherein the water jacket defines nozzles that direct oil onto an outer diameter of the end windings.

18. The electric motor of claim 12, wherein the at least two passages comprises four passages including a first diametrically opposed pair of passages and a second diametrically opposed pair of passages.

19. The electric motor of claim 12, further comprising:
a second end plate disposed at an opposite end of the rotor from the first end plate, the second end plate having a central hub and an overhang, the overhang including an outwardly extending radial rim and a lip, the radial rim including an outer surface, an inner surface, and at least two passages defined therethrough,
wherein the second end plate facilitates cooling of the electric motor by directing fluid (i) off of the outer surface of the radial rim and onto an inner diameter of the end windings; (ii) around the inner surface of the radial rim whereby the fluid builds pressure due to centrifugal force created from rotation of the rotor; and (iii) through the at least two passages and onto the inner diameter of the end windings.

* * * * *